United States Patent [19]

White, III

[11] 4,160,218

[45] Jul. 3, 1979

[54] LASER MONITOR AND CONTROL SYSTEM

[75] Inventor: Frederic H. White, III, Simi, Calif.

[73] Assignee: Rockwell International Corporation, El Segundo, Calif.

[21] Appl. No.: 809,234

[22] Filed: Jun. 23, 1977

[51] Int. Cl.² ............... H01S 3/095; H01S 3/13; H01S 3/101

[52] U.S. Cl. ............... 331/94.5 P; 331/94.5 C; 331/94.5 G; 331/94.5 S

[58] Field of Search ............... 331/94.5 G, 94.5 P, 331/94.5 S, 94.5 T, 94.5 K, 94.5 C, 94.5 D

[56] References Cited

FOREIGN PATENT DOCUMENTS 2508010 9/1976 Fed. Rep. of Germany ...... 331/94.5 S

OTHER PUBLICATIONS

Biriukov, et al., IEEE J. of Quantum Electronics, vol. QE 7, No. 8, Aug. 1971, pp. 388–391.
Kuehn, et al., Applied Physics Letters, vol. 16, No. 1, Jan. 1, 1970, pp. 48–50.

Primary Examiner—William D. Larkins
Attorney, Agent, or Firm—L. Lee Humphries; Robert M. Sperry

[57] ABSTRACT

A detector array generates a profile of the intensity of a laser beam, across the beam and in the direction of fluid flow in order to detect the spatial distribution of the laser gain. Control actions such as modifying the flow of diluent into the laser cavity is instituted to shift the beam zero-gain point out of the laser beam.

11 Claims, 6 Drawing Figures

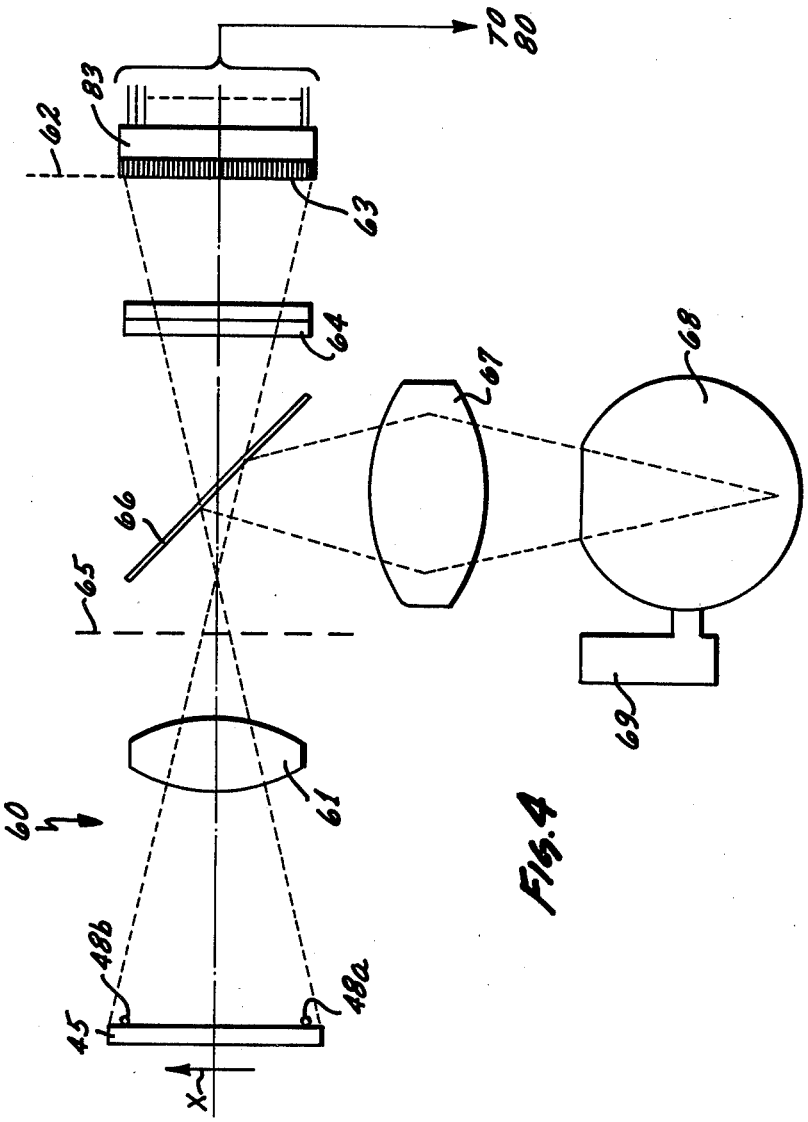

LASER MONITOR AND CONTROL SYSTEM

The invention herein described was made in the course of or under a contract or subcontract thereunder, (or grant) with the U.S. Army.

BACKGROUND OF THE INVENTION

The present invention relates to aspects of control of a chemical laser.

A chemical laser can be defined generally as a device in which a negative temperature and population inversion can be obtained as a result of one or several chemical reactions, with or without additional collision among the different molecules and/or atoms of a gas, but under particular pressure and/or temperature conditions permitting emission of radiation of one or several particular frequencies by stimulation through photons of like frequency or frequencies. This laser action, of course, occurs within a particular gas zone or region which gas is kept moving at a rather high speed, for purposes of replenishing the particular components actively participating in the laser action. Therefore, the laser cavity, as an optical cavity, is continuously traversed by a flow of various fluids which include the laser active component or components.

The laser beam traverses that flow region, and the particular beam or better, any particular ray of the beam as it traverses that flow region, will in parts be absorbed, attenuated, scattered, etc., by the gas flow, while stimulating action augments the intensity of the particular ray. As a consequence, each ray as it traverses this laser and gas flow cavity will, in total, either increase or decrease in intensity, i.e., will exhibit a positive or a negative gain (or a gain larger or smaller than unity depending on the definition of gain). At any given time and for an assumed state under stable fluid flow conditions, one can, therefore, define a gain profile across the flow region; more precisely, a gain profile can be defined along the flow region but across the laser cavity because usually the flow path extends transversely to the optical path in the cavity. Variations in fluid supply, fluid pressure, combustions or other reactions, and temperatures, also, possibly variations in nozzle dimensions, etc., are all parameters which may vary the gain as a whole, as well as the profile of the gain across the laser cavity. Variations of these parameters involve particularly the location of that portion of the gain curve which has positive values. As a consequence, the total power output of the laser as well as its intensity profile will vary greatly. This gain variation poses a problem which has to be resolved.

DESCRIPTION OF THE INVENTION

It is an object of the present invention to alleviate the problem outlined above and to stabilize the operation of a chemical laser as far as uniformity of output and intensity thereof is concerned.

It is a further object of the present invention to improve lasers in which a laser active fluid is dynamically established in an optical laser cavity, so that a zone in the fluid having positive gain is surrounded by a zone or zones of negative gain.

It is a further object of the present invention to improve chemical lasers in which a laser cavity is established above a plane of nozzles ejecting a flow of laser active fluid into the laser cavity; the improvement of specifically related to the location of the optical gain characteristics, i.e., the gain of laser action in and in relation to the fluid chamber as defined on the exit side of the nozzle plane.

It is, therefore, a specific object of the present invention to improve a chemical laser in which a plurality of different fluids are discharged into a laser cavity in one form or another, possibly after having undergone chemical modifications such as combustion, etc., to establish a laser active medium. A plurality of different fluid feed paths are provided in such a laser, and the laser cavity includes reflectors establishing an optical cavity and include means for extracting an output beam from the cavity.

In accordance with the preferred embodiment of the present invention, it is suggested to improve a laser, by providing detector means disposed in relation to the laser cavity, e.g. the beam extracting means, for detecting all or parts of the contour of the beam as extracted in representation of the beam profile in the cavity, along the direction of fluid flow in the cavity, with particular emphasis on the boundary of the beam being the farthest from the nozzle exit plane, and control means are provided and connected to the detector means for controlling at least one fluid as passing through the respective feed path to obtain a change in the gain profile so as to avoid passage of the laser beam in the cavity through a portion of negative gain. The detection is preferably a direct one, responding specifically to the laser beam intensity distribution near that beam boundary which, if at all, is most likely to traverse the low, zero or even negative gain portion of the laser cavity. Indirect detection may involve the increase in non-laser emissions out of the laser cavity and attributable to increased absorption (and re-radiation) of a part of the laser beam.

The detector means is preferably designed to be specifically responsive to an image provided from radiation scattered from one of the reflectors in the optical laser system as a whole, and that image yields information on the intensity profile of the beam in the direction of laser active fluid flow; that profile, in turn, permits extraction of direct or indirect information concerning the gain profile across the laser cavity. It was found that a negative gain within the optical cavity will reflect in a particular contour or contour deformation of the intensity profile so detected, and that deformation once detected, can be used for purposes of control of the flow of one or several fluids participating in the laser action. It was found to be of particular advantage to control the flow of a diluent that is being added to the laser active fluid. An increase, particularly in the pressure of the diluent added, has the effect of spreading the zone which, on account of a relative high density of laser active molecules, exhibits positive gain so that thereby the negative gain portion can be shifted out of the optical laser cavity.

The invention will be explained below with reference to a D-F laser and a tristream nozzle. However, the problem solved may arise in all lasers in which the laser active medium is fluid dynamically established, maintained and replenished, because in all these cases there will be a zone with positive gain as to laser action surrounded by zones of no or little laser action exhibiting negative gain. The laser beam has to be kept out of that surrounding zone or zones. The gain distribution will be controlled by controlling the fluid and thermo-dynamics of the laser active medium; the boundary between these zones of positive and negative gain must be optically detected by observing the behavior of the laser beam as a whole and near its fringes.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a schematic block diagram of the optical elements participating in the detection process;

FIG. 4a is a signal diagram plotted in aligned relation to a detector array in FIG. 4; and FIG. 4b shows an image as optically duplicated by the equipment of FIG. 4.

Proceeding now to the detailed description of the drawings, FIG. 1 shows schematically the essential elements of a chemical laser 10 in which the preferred embodiment of the invention may be practiced. The laser is assumed to be a D-F laser with a tri-stream nozzle. Section 11 refers specifically to an injector or injector assembly which is, in fact, an array of injector nozzles suitably connected to manifolds which in turn connect to a fluid supply 12. The fluid supply holds several different fluids under pressure; the fluids will be introduced one by one in this specification.

Fluid line 13 feeds hydrogen into a hydrogen manifold of the injector device for discharge through those nozzles in the injector device 11 which are connected to the hydrogen manifold. The discharge occurs into a combustion chamber 15. The second line 14 feeds fluorine or a fluorine compound into a fluorine manifold for discharge, also into the combustion chamber 15 and through appropriate nozzles. The combustion produces HF as well as atomic F at elevated temperature and pressure. In addition, a line 16 feeds helium to appropriate nozzles for discharge into the combustion chamber 15. The helium does not participate in the combustion process but serves as diluent to control the molecular density and temperature.

Figure 2:
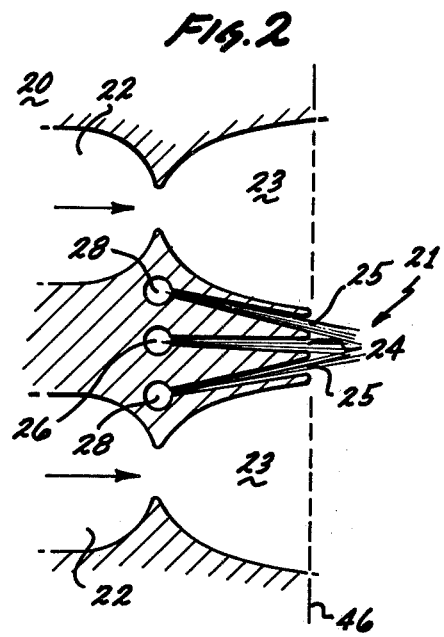
FIG. 2 illustrates on an enlarged scale a portion of a nozzle, a section being taken along line 22 in FIG. 1.

Reference numeral 17 refers to a nozzle chamber which contains a nozzle assembly 20, a portion of which is shown in greater detail in FIG. 2. The assembly 20 includes a row of nozzle blades 21, having a plurality of inlet chambers such as 22 being open to the combustion chamber 15 and receiving therefrom the combustion products. Each chamber 22 ends in an abrupt diffusor edge from which extend supersonic regions 23 to obtain a rapid depressurization accompanied by a temperature drop which is incidental, for accelerating the combustion products from chamber 15 into a supersonic flow of gasses.

This particular accelerated gas mixture contains atomic fluorine as primary product of interest but mixed with some flourine molecules, hydrogen molecules as well as HF and, of course, helium to the extent it was added as a diluent to the mixture. Each nozzle 23 between two blades 21 can be termed a primary nozzle, but each blade itself is constructed to include a secondary nozzle 24 flanked by two tertiary nozzles 25. The secondary nozzle 24 of a blade connects to a manifold duct 26 and all of these nozzles 24 and ducts 26 connect to a duct or duct system 27 which in turn is connected to the fluid supply 12, for receiving deuterium.

The tertiary nozzles 25 are connected to a manifold duct 28 in the respective blades 21, and these ducts 28 in turn are connected to a duct or duct system 29 leading to the fluid supply 12 for receiving therefrom helium as diluent. This particular addition of a diluent is of greater importance than the one mentioned earlier as far as the combustion chamber is concerned.

It can thus be seen that the supersonic regions 23, being the primary nozzles, as well as the nozzles 24 and 25 discharge various components at supersonic speed into a chamber 30 which is the laser cavity. A diffusor 31 discharges the gasses from the laser activity in chamber 30.

The laser action results from a combustion, i.e. an exothermic reaction in chamber 30 which combines the deuterium with the atomic fluorine. Moreover, the conditions under which the reaction occurs excite the DF molecules to exhibit states of energization which as far as molecular energy states are concerned, establish a population inversion being equivalent to a negative temperature. Therefore, the particular DF* molecules are in fact capable of laser action. The laser action extends into a zone above a plane 46 of the nozzles to the extent reactions between deuterium and atomic fluorine continues. Beyond the reaction zone the establishing of meta-stable states declines to such an extent that absorption of any radiation is larger than any stimulated increase on account of the population inversion. In other words, the density of DF* molecules drops off towards diffusor 31.

Figure 3:
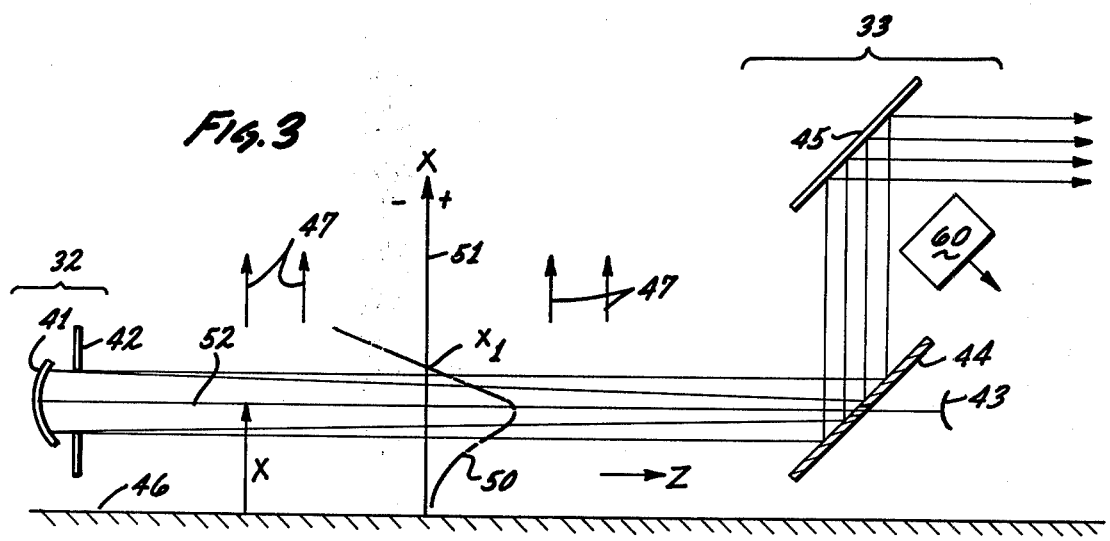
FIG. 3 is a schematic showing of the optical laser cavity in relation to a nozzle plane as it occurs within the laser and showing in addition the relative disposition of a detector.

The laser cavity 30 is optically bounded on one side by a first reflector, such as a concave mirror 41, see FIG. 3. A diaphragm 42 with a rectangular opening is placed in front of the reflector 41 to define the center of the laser beam. These elements 41, 42 are contained (see FIGS. 1 and 3) in an optic box 32 being disposed to one side of the laser cavity in chamber 30. This chamber and cavity 30 is optically bounded on the opposite side, as far as the reflector 41 is concerned, by a convex mirror 43 being contained in an optic box 33 together with other optical equipment and elements. The reflectors 41 and 43 are confocal and define between them an optical oscillator. Reflector 43 is part of an optical package which includes, in addition, a so-called scraper mirror 44 having an aperture for the optical path that terminates at mirror 43. Radiation is coupled out of the laser cavity by means of mirror 44. The optical package includes, in addition, a reflector 45 which directs the output laser beam into the desired direction.

In addition to the principle optic elements of the laser cavity, FIG. 3 shows also the nozzle exit plane 46 as defined by the blades 21. The laser zone or zones of the lasing action extends, of course, above that plane, and the participating fluids flow in the direction of arrows 47 towards the diffusor 31.

It is inherent in such an arrangement that the consistency of the laser active fluid exhibits a gain distribution that follows, for example, the superimposed, dash dot curve 50. The line 51 defines a zero line for the gain along which line distances X from the nozzle plane 46 are taken. This gain curve has validity as an integral taken over the entire length of the laser cavity in the direction Z. There may be local gain variations along the direction Z, however, they are of a secondary nature because only the integral gain is of interest, covering the entire length of a ray path between the two reflectors 41 and 43.

The gain curve represents specifically the following: Take any ray, such as 52 of laser action frequency or frequencies and traversing the laser cavity at a distance X from the nozzle plane 46, from one reflector to the opposite one. That ray has an intensity $I_0$ before traversing the zone of laser action between the reflectors, and an intensity $I_1$ upon leaving that zone (and before being returned). The intensity $I_1$ is larger than $I_0$ if any absorption, scattering and other attentuation is more than offset by the laser action as the beam ray traverses the laser cavity. The resulting gain is defined, for example by $(I_1-I_0)/I_0$ and is positive or negative accordingly. One could, of course, define the gain also as $I_1/I_0$ in which case we would distinguish between gain values above unity or below unity. For convenience we consider the first definition and will speak of positive and negative gain. The gain will be positive if a ray, such as 52, and travelling at the distance X across the laser cavity and fluid flow path stimulates a sufficient number of DF* molecules so that the increase in intensity is greater than the total of all scattering and other intensity reducing actions which the ray 52 suffers on its path. A negative gain results when the relations are reversed.

The curve 50, therefore, represents possible conditions as to positive and negative gain offered to such beams and rays by the fluid in that zone. The curve 50 teaches that there is a small positive gain near the nozzle plane 46, but the gain rises to a pronounced maximum at a specific distance from that plane commensurate with a maximum density of DF* molecules. The gain drops rather sharply for larger distances X, and at distances larger than $X_1$, the gain becomes negative. This is simply so because the balance between newly formed metastable DF* molecules and those which have been stimulated to emit a photon turns negative. In further distances from the nozzle laser action is outweighed by absorption, etc.; thus any ray traversing the cavity at a distance larger than $X_1$, is not enhanced but attenuated. Consequently, if the laser beam has any portion whose distance from the nozzle plane is larger than $X_1$, that portion of the laser beam is in fact attenuated rather than augmented, and that attenuation will most certainly have a deteriorating effect on the efficiency of the laser as a whole.

Elements 42, 43, and 44 are, of course, supposedly mounted so that the optical cavity they define together does not extend beyond the zone limited by $X_1$. That statement, however, has to be qualified because the particular gain curve 50 is strictly dynamically established on the basis of the fluid flow conditions. The ratio of the constituents and fluids fed to the various components, the temperatures of the reactions, etc. are additional parameters determining the gain curve. Any variation here changes the gain curve and shifts and distorts it in one form or another. Therefore, it is more correct to say that for a given geometric relation between the nozzle plane 46 and the optical cavity as defined by the elements 41, 42, 43, 44, the fluid dynamic and thermodynamic conditions for operating the nozzle as a whole should be such that a negative gain does not extend into the laser cavity. Furthermore, the gain maximum should be near the common optical axis of these mirrors.

The gain curve as such is of course established by the pressure in the fluid supply, by the pressure, density, and temperature resulting from combustion and by the nozzle dimension. All these parameters together determine the contour of the gain curve as well as the distance $X_1$ where the gain turns from positive to negative. Needless to say, that one will try to generate a rather large density as well as a large total number of metastable DF* molecules, to be replenished at a high rate. On the basis of such optimized, fluid-dynamically and thermodynamically established conditions, one will determine the needed width of the optical cavity and one will define the requisite width of the aperture of diaphragm 42 so that the upper laser beam boundary remains in the positive gain region.

The scraping reflector 44 is quite large and its outer boundaries, even when projected into a plane transversely to the optical axis of reflector 41, are larger than the aperture 42; the same is true with regard to mirror 45. Reflectors 44 and 45 should capture all radiation returned by reflector 41 and not incident upon reflector 43. The system to be described next is provided to make sure that these desired conditions are in fact maintained.

A detector 60 is provided in order to monitor the relative location of the laser beam, and the detector outputs will be used to ascertain the actual location of the zero gain point and other data. The detector has an optical input axis about transversely to the axis plane of reflector 45. It should be realized that even though reflector 45 provides as specular a reflection as possible, a certain portion of any incident beam will be scattered even by a highly polished surface. Even though that scattered portion is minute on a proportional basis, i.e. in relation to the intensity of specularly reflected beam portions, the scattered radiation is still of significant magnitude on account of the high intensity of the beam that is incident upon the reflector 45. This detector 60 is shown as a separate box in the schematic diagram of FIG. 1 but it will be understood that detector 60 is physically contained in the optic box 33.

Figure 1:
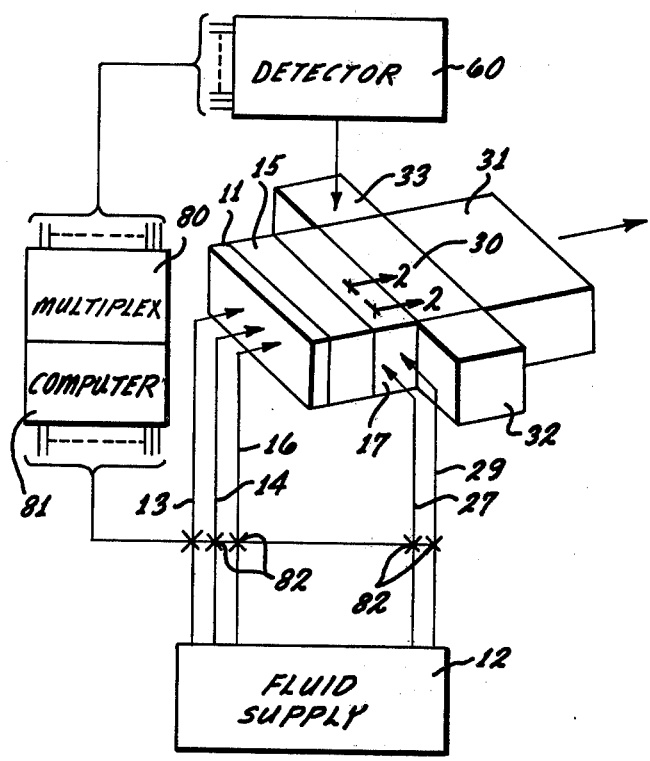
FIG. 1 illustrates somewhat schematically and partially in perspective view, a chemical laser as improved in accordance with the preferred embodiment of the present invention.

Before proceeding to details of the detection process, the description of FIG. 1 should be completed on a summary basis. The detector 60 has multiple outputs which are fed to an aquisition unit 80 (multiplexer) being an input device for a computing facility 81 which determines the relation between the laser beam and the gain curve. Moreover computer 81 calculates control signals to operate valves 82 in the feeder lines 13, 14, 16, 27, and 29 leading from supply 12 to the various nozzles. Of particular interest is the control of the flow of helium in duct or line 29 because increasing the flow will shift the gain curve and particularly the zero point to a larger distance from nozzle plane 46.

Turning now to particulars of the detector shown in FIG. 4, the figure shows again the reflector 45, and the direction X as plotted represents the projection of the distances X from the nozzle plane, into the detection system of FIG. 4. The direction Y, of course, extends transversely to the plane of both FIGS. 3 and 4. The direction Z has no significance in FIG. 4.

An optical imaging system 61 images the plane of reflector 45 into detection plane 62 which includes a linear array of detector cells 63. These individual detectors are, for example, cooled semi-conductors, and they are arranged in a direction being the projection of the direction X into the plane 62. In lieu of semi-conductors one could employ individual pyro-electric detectors.

The optical detection system includes, in addition, a cylindrical lens 64 contracting the image in the Y direction. Without the cylindrical lens 64, lens 61 would produce an image as shown in FIG. 4b. The outer rectangle represents the aperture of diaphragm 42. The inner rectangle is the image of the scraping edge of reflector 44. The area between the two rectangles represents a cross-section through the beam. Lens 64 contracts the image of that cross-section in the Y direction. Thus, the light detected by each detector of array 63 integrates the intensity in a direction (Y) which is perpendicular to the direction of gas flow; the array detects the intensity profile of the laser beam taken along the fluid flow direction X, and each amplitude value represents the summation of the intensity of the beam across the width dimension (Y) of the laser cavity.

In the alternative one could use a slot diaphragm to slice a portion of the beam in the particular Y position, as indicated by the two dotted lines in FIG. 4b. FIG. 4a shows the intensity distribution as detected by the detector array and in alignment therewith. There will be two pronounced lobes 71 and 72, and the drop between the lobes results in effect from the window of the scraping mirror 44. The intensity would be about zero between the lobes if one uses a slicing diaphragm. A cylindrical lens will produce just a reduced level between the lobes; the drop depends on the rectangularity of the cross-section through the laser beam.

The mirror 45 will be provided in addition with reference markers 48a and 48b being just markings for example of enhanced light diffusion (little or no specular reflection). These markings are generally outside of the zone of mirror 44 participating in the reflection of the laser beam; however, due to scattered radiation these two markings will be clearly visible, and they produce, therefore, two sharply defined marking lobes 73a and 73b which will be detected by the array of detectors 63 in image plane 62.

These markings when (hypothetically) projected back into the optical laser cavity correspond to two specific distances $X_a$ and $X_b$ ($X_b > X_a$) and, therefore, permit a geometric correlation of the dimensions of the laser cavity in the gas flow direction, with the linear detection array. This way any position change of the detector relative to the laser cavity and its optical system can be compensated. On the other hand, each of the parts of the optical system 42 through 45 is presumed to have a fixed and rigid geometic relation to all of the other parts of that system. Any variations here may be servo controlled, independently from the system presently described and can, therefore, be considered to be a constant set of parameters as far as the transposition of geometry of the laser cavity into the detection system is concerned.

The detector 60 includes, in addition, a light chopper 65 to obtain a modulation of the extracted radiation and to permit elimination of optical background noise from the desired information. The electric circuitry connected to the various detectors will include bandpass filters 83 being particularly responsive to signals of the chopper frequency and having rectifier outputs to obtain D.C. signals representing the local image intensity.

A beam splitter 66 is interposed in the detector path to branch off a portion of the entire image in detector 60. A lens or lens system 67, together with lens or lens system 61, provides an image of the mirror 45 into an integrating sphere 68 cooperating with a detector 69 for purposes of obtaining a signal indicative of total radiation intensity. This signal can be used to normalize the signals from detectors 63 to obtain signals representing the relative intensity distribution in direction of gas flow (X) but independent from the absolute output of the laser.

The two lobes 71 and 72 yield significant information about the laser active process in the optical laser cavity. The lobe 72 represents a portion of the beam farther from the nozzle plane than the laser beam portion represented by lobe 71. Therefore, the peak value of the lobe 72 in relation to the peak value of the lobe 71 indicates whether or not the gain curve has changed its position. If that ratio declines, the gain curve may have shifted the gain zero point from the desired value $X_1$ to a smaller value. Thus, the shift can be detected by detecting a deviation of the ratio of the peak values of the two lobes from a prescribed normal, such as $\frac{2}{3}$. Should the peak value ratio drop from this particular, desired ratio, it becomes necessary to shift the gain curve up again. This return shift can be accomplished by increasing the flow and the effective pressure of the diluent helium in the nozzle system so that the speed of the gas flow is increased and the zone of laser action is thereby extended because a higher speed does, in effect, spread the number of laser active molecules DF* in the direction of gas flow. Of course, the peak values of the lobes may change in opposite directions, for example, for reasons of an extension of the zone of laser action away from the nozzle plane. This is, likewise, not desirable as a spreading and thinning of the laser action over too large a zone may reduce the overall gain. In this case, the diluent flow should be throttled.

A shift of the gain curve relative to the plane 46 is not the only possible cause for any change in the local laser beam intensities as represented by either or both lobes 71, 72. The contour of the gain curve may change for reasons of pressure fluctuation of the various fluids participating in the laser action, but without shifting the zero point. However, the lobe peak ratio may still change in a manner that seems to indicate a shift of the zero point. Here now, one must consider the overall power output as detected by the detector 68 and 69.

Of course, the ultimate purpose of any detector and control is to avoid a drop in the laser output. However, it must be realized that a mere summary detection of power output yields little in terms of error analysis. The contour of the individual lobes 71, 72, the location of their peaks, in relation to the marking 48a, b, lobes 73a, b, the peak-to-peak distance of lobes 71, 72, the base width of each or both of the lobes are all parameters which can be drawn from the outputs of the detectors 63, and these outputs yield significant information with regard to the contour of the gain curve.

For example, an increase in the distance between the two peaks is indicative of a flattening of the gain curve. This particular change, in conjunction with a peak ratio decline may indicate that the gain curve has changed its contour to a less pronounced maximum rather than having shortened the distance of the point from nozzle plane 46 in which the gain turns negative. Consequently, the ratio of the active participants in the laser action rather than the diluent should be changed in that case. It must be borne in mind that the primary objective is to detect the beam contour in relation to the gain curve and here particularly the location (distance $X_1$) of the zero point. But the gain curve and particularly that zero point is not a physical reality or object. Therefore, one must resort to indirect detection methods, and for this one needs several indicators before any particular change can be identified as a migration of the zero gain point into the laser beam.

One can readily see that the detector means as established by the particular detectors 63 which respond to the beam intensity more remote from nozzle plane 46 (lobe 72), provide a primary indication as to any shift of the gain zero point from the value $X_1$. The output of these detectors is primarily responsible for the detection of an intensity drop in the portion of the laser beam more remote from nozzle plane 46. But, additional information is needed before a drop in signal level corresponding to a decline in the lobe 72 peak amplitude can be interpreted as an encroachment of the beam into the low, zero, or even negative gain region of the cavity. One such additional information is the intensity of the other lobe (71), because a shift of gain point zero requires that the amplitudes of lobes 71 and 72 change in opposite direction, but as stated, they will do so also if the gain course flattens, without reduction in overall gain. Thus an undesired zero point shift requires a decline in the peak-to-peak ratio accompanied by an overall reduction in beam intensity. In other words, the peak-to-peak ratio taken together with the total laser output track the location of gain zero distance $X_1$.

The measuring signals from the detectors 63 as filtered and rectified are individually high-speed-scanned by the acquisition system 80. The scanning and multiplexing is a stepwise, cyclically repeated operation whch permits individual identification of each detector. The outputs of each particular detector as sequentially provided will conveniently be stored in the same memory location of the computer 81 so that a rather straightforward correlation is available between detected signal values, detector-memory addresses and X-scale values.

Detection of the marker lobes 73a and 73b establishes a geometric reference through which individual detectors can be correlated with X values on a floating basis. Since significant changes in the reference peak detection will not occur from scanning cycle to scanning cycle, it can be expected that the detectors which responded to the reference lobes 73a, b during the previous acquisition cycle, have done so also in the just completed acquisition cycle, or the detectors on either side of them have now responded. Thus, following each acquisition cycle the program will determine which detectors have responded to the reference lobe peaks, particularly whether the same memory cells hold the peaks of the reference lobes which held these values following the preceding cyle, or whether an adjacent memory now holds the reference lobe peak. This preliminary test fixes the x-scale with reference to all the detectors in between as far as the just completed scanning cycle is concerned.

Next, the computing facility 81 will detect the detector-address and X equivalent of the peaks or lobes 71, 72. For example, the program will search for the highest detected signal value among the output signals furnished by a plurality of detectors being particularly spaced from the detectors which detected the reference lobes 73a, b. Having found the address for the memory locations which hold the detected peak values of the lobes 71, and 72, the ratio of these peak values is calculated. The detector and memory addresses, i.e. the addresses or location-identifying numbers of the detectors which responded to the lobe peak are compared with each other in order to determine the peak-to-peak spacing. The lobe contour is ascertained, for example, by determining for each lobe 71, 72, which detectors on both sides of the peak hold values being a specific percentage, for example, halfway down from the respective lobe peak value. The detected addresses meeting that criterium yield an indication of the widths of each lobe. In addition, of course, detector 69 provides a running value of total beam intensity for the computer. The detector 69 could conceivably be included in the multiplex scanning cycle interrogating the detectors 63.

Thus, the relevent lobe data as well as all parameters defining the intensity distribution across the laser beam width can readily be calculated from the detected amplitudes as well as from the spatial relation between specific detected values and amplitudes. It is conceivable that different lobe contours as definable in those terms are correlated in a look-up table in computer 81 storing representations of different gain contours.

The computing facility 81 may, in addition, include the necessary software being the equivalent of feedback control, that is to say the computing facility 81 will contain reference values to be compared with measured and calculated data. In the case of any deviation, control actions are instituted. Each specific set of calculated values may require a different set of control steps.

As was mentioned earlier, valves 82 are provided as output devices for the computer 81, and these valves are located in and control the flow in the fluid supply line. These valves are actuated in accordance with the necessary control characteristics being calculated on the basis of the detected deviation and on the basis of necessary operating characteristics which, of course, are empirically determined before hand. For example, the valve 82 in the line 29 controls the flow of diluent into the laser chamber in response to an undesired zero gain shift.

Assuming that the peak intensity of the beam portion farther from the nozzle exit plane 46 (lobe 72) declines in relation to the peak intensity of the beam portion closer to the plane 46 (lobe 71), that change if not accompanied by a decline in overall output may be merely attributable to a change in the gain curve contour without encroachment into the zero and negative gain portion. In that case, no control action will be instituted as far as the flow of diluent is concerned. However, if a decline in overall beam intensity is detected, and concurs with a decline in the lobe peak ratio, the valve 82 in line 29 may be opened slightly more to feed more helium into the chamber 30. If that operation is immediately followed by a change in the said ratio towards a return to normal, and if that change is accompanied by an overall output increase, the control action is continued until the desired ratio is restored. If the overall output intensity does not increase, the increase in diluent flow is stopped and instead, for example, the flow of that one of the other constituents (D or $F_2$) will be increased whose increase has, by design, the effect of increasing the DF* population.

The mode of detecting the boundary of the laser beam in the cavity in relation to the gain distribution as described above is based on a change in the relative intensity distribution of the beam. One may use different modes of detection. For example, a relative down shift of the gain zero point will in fact increase absorption. This in turn will give rise to a change in the frequency spectrum of emission of radiation from the laser cavity, whereby specifically certain frequencies (other than the laser frequency) will show increased intensities.

FIG. 3 shows a modification of supplement along that line. A detector 60' may be disposed to observe secondary effects as they may result from passage of the beam through a negative gain region. Such a passage in fact result in increased absorption and/or scattering which becomes indirectly detectible by detection of an increased emission from the cavity 30 at frequencies other than the laser frequencies. This detection process may be frequency selective and the increase in intensity of such emissions of specific frequencies (coupled with an absence or lesser increase of other frequencies) may be an indication that the gain curve change is attributable to an excess of particular fluid molecules, requiring a slight throttling of the flow of that particular fluid.

In a simplified version of the above described preferred embodiment, one may restrict the detection to just the two lobes 71, 72, or even just a portion thereof. The detection will be rather coarse but may satisfy the accuracy requirements. The peak-to-peak ratio can be formed in a simpler analog network which is connected in a circuit for forming an error signal which in turn, after due amplification, just controls the valve 82 in the helium line 29.

I claim:

1. In a chemical laser wherein a plurality of different fluids are discharged into a laser cavity to establish a laser active medium, there being a plurality of different fluid feed paths provided to the laser, the laser cavity including plural reflector means establishing an optical cavity and including means for extracting an output beam from the cavity, the improvement comprising: detection means disposed in relation to the extracting means for detecting the contour of the beam as extracted in representation of the beam profile in the cavity along a direction of fluid flow in the cavity; and control means connected to the detection means for controlling at least one fluid as passing through the respective feed paths to obtain a change in a laser gain profile, for avoiding passage of the laser beam in the cavity through a portion of negative gain.

2. In a laser, as in claim 1, including additional detection means for detecting the overall intensity of the beam, the additional detection means being also connected to the control means to obtain a modification of the control as provided.

3. In a laser as in claim 1, wherein the extracting means include at least one reflecting surface, the detection means including means for imaging at least a portion of said reflecting surface on the basis of scattered radiation.

4. In a laser as in claim 1, said detection means disposed to detect a scatter image of the laser beam as reflected by one of the reflector means, and including means to obtain a profile therefrom; further including means responsive to particular amplitude characteristics within said profile to obtain a representation of the location of a zero gain distance in the laser cavity.

5. In a laser as in claim 1, said control means including means to control the distribution and density of laser active molecules in the direction of fluid flow in the cavity.

6. In a laser as in claim 1, said detection means including plural detectors detecting different beam intensities in different zones in the direction of fluid flow, the control means including means for comparing outputs of the plural detectors with each other.

7. In a chemical laser wherein a plurality of different fluids are discharged into a laser cavity to establish a laser active medium, there being a plurality of different fluid feed paths provided to the laser, the laser cavity including plural reflector means establishing an optical cavity and including means for extracting an output beam from the cavity, the improvement comprising:

detection means disposed in relation to the laser cavity for detecting the boundary of the beam in relation to a laser gain distribution across the cavity; and control means connected to the detection means for controlling at least one fluid to obtain a change in fluid discharge into the laser cavity to change the distribution of molecules available for laser action so as to obtain a change in a gain profile and avoiding passage of the laser beam through a zone of negative gain.

8. In a laser as in claim 7, said detector means having disposition for detecting an intensity profile distribution, at least for a portion of beam travelling through the laser cavity relatively far from the entrance of the fluid into the cavity, said control means responding to a drop in at least a portion of the intensity distribution.

9. In a laser as in claim 7, said detector means responding to a secondary radiation effect in the laser cavity resulting from passage of a portion of the beams through a negative gain zone.

10. In a chemical laser wherein a plurality of different fluids are discharged into a laser cavity to establish a laser active medium, there being a plurality of different fluid feedpaths provided to the laser, the laser cavity including plural reflector means establishing an optical cavity and including means for extracting an output beam from the cavity, the improvement comprising:

means for detecting the disposition of the laser beam in relation to a zero point of a laser gain distribution curve across the cavity and resulting from variations in the presence and production of laser active molecules; and means connected to the means for detecting for controlling at least one fluid to change the gain distribution for shifting the zero point away from the laser beam in the laser cavity.

11. In a laser as in claim 10, said means for detecting include means for obtaining an image of the cross section of the beam or of a portion thereof and means for detecting a relative distortion in said image.

* * * * *